United States Patent
Lyu et al.

(10) Patent No.: US 10,841,803 B2
(45) Date of Patent: Nov. 17, 2020

(54) DATA CHANNEL SENDING AND RECEIVING METHODS, NETWORK DEVICE, AND TERMINAL

(71) Applicant: Huawei Technologies Co., Ltd., Shenzhen (CN)

(72) Inventors: Yongxia Lyu, Ottawa (CA); Wei Sun, Shenzhen (CN); Zhiheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/270,744

(22) Filed: Feb. 8, 2019

(65) Prior Publication Data
US 2019/0200235 A1    Jun. 27, 2019

Related U.S. Application Data

(63) Continuation of application No. PCT/CN2017/095292, filed on Jul. 31, 2017.

(30) Foreign Application Priority Data

Aug. 10, 2016  (CN) .......................... 2016 1 0654618

(51) Int. Cl.
*H04W 72/04*    (2009.01)
*H04W 16/02*    (2009.01)
(Continued)

(52) U.S. Cl.
CPC ........... *H04W 16/02* (2013.01); *H04L 1/0023* (2013.01); *H04L 5/0042* (2013.01);
(Continued)

(58) Field of Classification Search
CPC .... H04W 16/02; H04W 72/04; H04W 72/042
See application file for complete search history.

(56) References Cited

U.S. PATENT DOCUMENTS

| 2012/0082079 A1 | 4/2012 | Luo et al. |
| 2014/0036806 A1 | 2/2014 | Chen et al. |

(Continued)

FOREIGN PATENT DOCUMENTS

| CN | 1635803 A | 7/2005 |
| CN | 101123599 A | 2/2008 |

(Continued)

OTHER PUBLICATIONS

Nokia, et al.,"Punctured Scheduling for Low Latency Transmissions", 3GPP TSG-RAN WG1 #85, R1-165381, Nanjing, P.R. China, May 23-27, 2016, 4 pages.

(Continued)

*Primary Examiner* — Chi Ho A Lee
(74) *Attorney, Agent, or Firm* — Slater Matsil, LLP

(57) ABSTRACT

Data channel sending and receiving methods, and an apparatus are disclosed. The network device sends indication information to the terminal, where the indication information indicates that the terminal needs to detect data channel puncturing information. The network device sends the data channel puncturing information to the terminal. The network device sends a data channel to the terminal, where the data channel is punctured at a resource location.

17 Claims, 6 Drawing Sheets

(51) Int. Cl.
*H04L 5/00* (2006.01)
*H04L 1/00* (2006.01)

(52) U.S. Cl.
CPC .......... *H04L 5/0044* (2013.01); *H04L 5/0087* (2013.01); *H04L 5/0092* (2013.01); *H04L 5/0094* (2013.01); *H04W 72/042* (2013.01)

(56) References Cited

U.S. PATENT DOCUMENTS

| | | |
|---|---|---|
| 2014/0036809 A1 | 2/2014 | Xu et al. |
| 2014/0334328 A1 | 11/2014 | Tong et al. |
| 2015/0334685 A1 | 11/2015 | Ji et al. |
| 2016/0234857 A1* | 8/2016 | Chen ................. H04W 72/1231 |
| 2017/0230994 A1* | 8/2017 | You ..................... H04W 72/042 |
| 2017/0251463 A1* | 8/2017 | Kwak ....................... H04L 5/00 |
| 2017/0285130 A1* | 10/2017 | Kim ........................... H04L 1/00 |
| 2017/0332370 A1* | 11/2017 | Rico Alvarino ...... H04L 5/0048 |
| 2017/0359086 A1* | 12/2017 | Kudekar ............. H03M 13/616 |
| 2017/0359807 A1* | 12/2017 | Hong ................. H04W 52/325 |
| 2019/0165882 A1* | 5/2019 | You ................. H04W 72/0453 |
| 2019/0174440 A1* | 6/2019 | Kwak ............... H04W 52/0216 |
| 2019/0190655 A1* | 6/2019 | Pan ..................... H03M 13/356 |
| 2019/0239123 A1* | 8/2019 | Kim ...................... H04L 5/1469 |

FOREIGN PATENT DOCUMENTS

| | | |
|---|---|---|
| CN | 101132204 A | 2/2008 |
| CN | 101335726 A | 12/2008 |
| CN | 101951639 A | 1/2011 |
| EP | 2848064 A2 | 3/2015 |
| JP | 2015525043 A | 8/2015 |
| RU | 2539577 C2 | 1/2015 |
| WO | 2012107106 A1 | 8/2012 |
| WO | 2013168116 A2 | 11/2013 |
| WO | 2016112131 A1 | 7/2016 |

OTHER PUBLICATIONS

New Postcom, "PDSCH muting for CSI-RS in LTE-Advanced", 3GPP TSG RAN WG1 Meeting #62, R1-105031, Madrid, Spain, Aug. 23, 2010, Aug. 27, 2010, XP050450285, 4 pages.

Huawei, et al., "Multi-subframe scheduling design for eLAA", 3GPP RAN WG1 Meeting #85, R1-164075, Nanjing, China, May 23, 2016-May 27, 2016, May 14, 2016, XP051096609, 8 pages.

Huawei et al., "Consideration on multiplexing of non-sTTI and sTTI in the same carrier", 3GPP TSG RAN WG1 Meeting #84bis, R1-162590, Busan, Korea, Apr. 11-15, 2016, 4 pages.

* cited by examiner

DATA CHANNEL SENDING AND RECEIVING METHODS, NETWORK DEVICE, AND TERMINAL

CROSS-REFERENCE TO RELATED APPLICATIONS

This application is a continuation of International Application No. PCT/CN2017/095292, filed on Jul. 31, 2017, which claims priority to Chinese Patent Application No. 201610654618.9, filed on Aug. 10, 2016. The disclosures of the aforementioned applications are hereby incorporated by reference in their entireties.

TECHNICAL FIELD

This application relates to the communications field, and in particular, to data channel sending and receiving methods, a network device, and a terminal.

BACKGROUND

As a communications system evolves, a 5th generation (5G) communications system is being researched.

The 5G system supports three communication services that are respectively an enhanced mobile broadband (eMBB) service, a massive machine type communications (mMTC) service, and an ultra-reliable and low latency communications (URLLC) service. The 5th generation communications system supports a higher carrier frequency, larger bandwidth, a larger quantity of aggregation carriers, and a more flexible subframe structure, supports flexible subcarrier spacing and a flexible transmission time interval (TTI) length, and supports more flexible resource scheduling. The eMBB service requires a high transmission rate, is less sensitive to latency, and requires high spectral efficiency and large bandwidth. The mMTC service is usually a small-sized service insensitive to latency, and requires a system to support a large quantity of connections. The URLLC service is usually a burst emergency service, has a high requirement on transmission reliability and a transmission latency, and requires that 99.999% transmission reliability is reached within 1 ms. To ensure the latency requirement of the URLLC service, URLLC data needs to be immediately sent after reaching a network device (for example, a base station). In other words, a time-frequency resource used to send the URLLC data anytime is required.

In the 5G system, data of different services may be multiplexed on one carrier, and a multiplexing mode is frequency division multiplexing (FDM) or time division multiplexing (TDM). The mMTC service with a massive service volume and the eMBB service may multiplex a resource in the FDM mode. Because the URLLC service is a burst emergency service, services are relatively sparse. If the URLLC service and another service multiplex a resource in the FDM mode, resource waste is caused. If the URLLC service and other service multiplex a resource in the TDM mode, because the URLLC service has a very high latency requirement, if a transmission time interval (TI) used by the other service is relatively large, there may be no available resource used to transmit the URLLC data. Consequently, the latency requirement of the URLLC service cannot be met. Currently, to ensure the latency requirement of the URLLC service and to avoid resource waste, the URLLC data may be transmitted in a data channel puncturing manner. To be specific, when the URLLC data reaches the network device, the data of the URLLC service is transmitted in some symbols of some resource blocks in a TI that has been used to transmit data of the other service.

The URLLC data may be immediately transmitted in the data channel puncturing manner when the URLLC data reaches the network device. In this way, the latency requirement of the URLLC service is met. However, when communication is performed in the data channel puncturing manner, transmission performance of data originally using a data channel resource is often affected.

SUMMARY

Embodiments of this application provide data channel sending and receiving methods, a network device, and a terminal, so that when communication is performed in a data channel puncturing manner, transmission performance of performing data transmission in a data channel resource is improved.

According to a first aspect, data channel sending and receiving methods are provided. In the methods, a network device sends, to a terminal, indication information indicating that the terminal needs to detect data channel puncturing information. The terminal receives the indication information sent by the network device, and determines that the data channel puncturing information needs to be detected. The network device sends, to the terminal, the data channel puncturing information indicating a punctured resource location, and the terminal receives the data channel puncturing information, so that the punctured resource location in a data channel can be determined. The network device sends the data channel that is punctured at the resource location to the terminal. The terminal receives the data channel from the network device, and ignores information carried at the punctured resource location of the data channel, in other words, does not demodulate the information carried at the punctured resource location.

In the data channel sending and receiving methods provided in this embodiment of this application, the network device sends, to the terminal, the indication information indicating that the terminal needs to detect the data channel puncturing information, so that the terminal detects the data channel puncturing information only when needing to detect the data channel puncturing information. Therefore, unnecessary detection performed by the terminal can be avoided, and performance is improved. Further, the network device sends the data channel puncturing information to the terminal, so that the terminal may determine, when receiving data, data on which resource location in a data channel does not belong to the terminal, and data is more desirably received. Therefore, a performance loss caused by puncturing during data transmission is reduced.

In this embodiment of this application, the punctured resource location is a punctured time domain symbol location and/or a punctured resource block location.

In this embodiment of this application, the network device may send the data channel puncturing information before sending the data channel, may send the data channel puncturing information after sending the data channel, or may send the data channel puncturing information during a process of sending the data channel.

Optionally, the network device may send the indication information to the terminal in a system message or RRC signaling.

In a possible design, the indication information includes a modulation and coding scheme or a modulation scheme used for the data channel of the terminal, and when an order used by the modulation and coding scheme or the modulation scheme is less than or equal to an order threshold, the terminal needs to detect the puncturing information.

Optionally, the indication information may be sent in first downlink control information indicating the resource location in the data channel, the indication information includes the modulation and coding scheme or the modulation scheme used for the data channel, and the order used by the modulation and coding scheme or the modulation scheme is less than or equal to the order threshold. The network device sends the indication information in the first downlink control information. After receiving the indication information in the first downlink control information, the terminal may determine that the puncturing information needs to be detected.

Optionally, the order threshold may be preset, or may be notified by the network device to the terminal in a notification message. Presetting the order threshold is that the order threshold is a default order threshold for the network device and the terminal, and the network device does not need to send signaling to instruct the terminal performing communication to preset the order threshold. When the network device notifies the order threshold to the terminal in the notification message, the network device sends the notification message to the terminal in a system message or RRC signaling, and the terminal obtains the order threshold by receiving the system message or the RRC signaling.

In another possible design, the network device in this embodiment of this application may directly indicate, in the indication information, that the terminal needs to detect the data channel puncturing information. After receiving the indication information, the terminal directly determines that the used data channel is punctured. When the terminal has not received the indication information, the terminal may directly determine that the used data channel is not punctured.

In still another possible design, the network device notifies the resource location used for the data channel to the terminal. When the resource location includes a preset punctured resource location, the terminal needs to detect the data channel puncturing information.

The preset punctured resource location is a punctured frequency domain resource location, such as a punctured resource block location, a punctured subband location, or a punctured carrier.

Optionally, the indication information may be sent in the first downlink control information indicating the resource location in the data channel, and the indication information includes a preset resource location to be punctured in the data channel.

The preset resource location may be preset by a system, or is notified in a system message or higher layer signaling (such as RRC signaling). The network device sends information about the preset resource location to the terminal in the system message or the higher layer signaling (such as the RRC signaling), and the terminal obtains the information about the preset resource location by receiving the system message or the higher layer signaling (such as the RRC signaling).

In yet another possible design, the network device may send the data channel puncturing information in second downlink control information, and the terminal may receive the data channel puncturing information in a downlink control channel.

In this embodiment of this application, the second downlink control information is sent in a common search space. The terminal detects the second downlink control information in the common search space, and determines the punctured resource location based on the detected second downlink control information.

The data channel puncturing information sent by the network device or received by the terminal includes the punctured resource location, and the punctured resource location includes a punctured time domain symbol location and/or a punctured resource block location in the data channel.

Optionally, in this embodiment of this application, the second downlink control information includes all punctured resource locations in the data channel, and a piece of second downlink control information may be sent to notify the data channel puncturing information to all terminals transmitting data in a punctured data channel. In the implementation, sent data in the DCI can be reduced and load of the downlink control channel can be reduced.

In a possible implementation, the second downlink control information may be scrambled by an RNTI having a specified value, to identify that the second downlink control information is downlink control information used to send the data channel puncturing information.

Optionally, in this embodiment of this application, the second downlink control information that is scrambled by the RNTI and that indicates the data channel puncturing information may use the same number of information bits as that in other downlink control information format, to reduce a quantity of blind detection times of the terminal.

In another possible implementation, the network device may send the data channel puncturing information by extending other downlink control information. In addition to a bit used to notify scheduling information, the other downlink control information further includes an extension bit. The extension bit indicates the data channel puncturing information. The terminal receives the downlink control information, and determines the punctured resource location by the extension bit.

In this embodiment of this application, the other downlink control information may be extended, and a new downlink control information format does not need to be added.

In still another possible implementation, a manner in which data transmission in a short transmission time interval is disabled using the second downlink control information indicates the data channel puncturing information.

The short transmission time interval is a transmission time interval that is less than 1 ms. For example, a transmission time interval of 1 ms is 14 symbols. The short transmission time interval may be two symbols, three symbols, or four symbols.

The disabling indicates that data transmitted in the short transmission time interval does not need to be received. In this embodiment of this application, indicating that a data channel in the short transmission time interval is disabled includes indicating that the data channel in the short transmission time interval is punctured.

In yet another possible implementation, the data channel puncturing information may further include a sequence indicating that the data channel is punctured, and the terminal determines, by detecting the sequence, whether the data channel is punctured.

The sequence includes a first sequence. The first sequence is located in a preceding time domain symbol of a time domain symbol where the punctured resource location in the data channel is located, and indicates that puncturing is performed starting from the next time domain symbol of the time domain symbol where the first sequence is located. When the network device sends data, the first sequence is inserted into the preceding time domain symbol of the time domain symbol where puncturing is performed. When receiving the data, the terminal performs detection on the first sequence. If the first sequence is detected, puncturing is performed starting from the next time domain symbol after the time domain symbol where the first sequence is located. The carried information may be ignored by the terminal, and that the carried information may be ignored is that data demodulation is not performed on the carried information.

Optionally, the sequence may further include a second sequence. The second sequence is located in a next time domain symbol of a last time domain symbol where the punctured resource location in the data channel is located, and indicates that the data channel is not punctured starting from the time domain symbol where the second sequence is located. When the network device sends data, the second sequence is inserted into the next time domain symbol of the last time domain symbol where the punctured resource location is located, so that the terminal can determine, when the second sequence is detected, that the time domain symbol where the second sequence is located and a time domain symbol after the time domain symbol where the second sequence is located are not punctured, and the terminal normally receives the carried information.

In this embodiment of this application, the puncturing information is indicated by a sequence, so that the terminal can be instructed to detect the data channel puncturing information while control information and signaling are not added.

According to a second aspect, a network device is provided, where the network device has a function of implementing actions of the network device in the first aspect. The function may be implemented by hardware, or may be implemented by hardware executing corresponding software. The hardware or software includes one or more modules corresponding to the foregoing function.

In a possible design, the network device includes a processing unit and a sending unit. The processing unit is configured to: determine indication information indicating that a terminal needs to detect data channel puncturing information, and determine a data channel and the data channel puncturing information. The sending unit is configured to send the indication information, the data channel puncturing information, and the data channel that are determined by the processing unit to the terminal. The data channel puncturing information indicates a punctured resource location, and the data channel is punctured at the resource location.

In another possible design, the network device includes a processor and a communications interface. The processor is configured to support the network device in performing the corresponding function in the method, for example, by determining indication information indicating that a terminal needs to detect data channel puncturing information, and determining a data channel and the data channel puncturing information. The communications interface is configured to support functions, for example, by sending the indication information, the data channel puncturing information, and the data channel that are determined by the processor to the terminal, and is further configured to support communication between the network device and the terminal or other network entity. Further, the network device may further include a memory, and the memory is configured to be coupled to the processor, and stores a program instruction and data that are necessary for the network device.

The network device may be a base station device. The base station device may further include a transmitter/receiver, and the transmitter/the receiver is configured to support communication between the base station device and the terminal in the foregoing method example.

According to a third aspect, a terminal is provided, where the terminal has a function of implementing actions of the terminal in the first aspect. The function may be implemented by hardware, or may be implemented by hardware executing corresponding software. The hardware or software includes one or more modules corresponding to the foregoing function.

In a possible design, the terminal includes a receiving unit and a processing unit, where the receiving unit is configured to receive indication information, data channel puncturing information, and a data channel from a network device. The processing unit is configured to: determine, based on the indication information received by the receiving unit, that the data channel puncturing information needs to be detected, and determine a punctured resource location in the received data channel based on the data channel puncturing information received by the receiving unit.

In another possible design, the terminal includes a processor and a communications interface. The processor is configured to support the terminal in performing functions, for example, by determining, based on indication information, that data channel puncturing information needs to be detected, and determining a punctured resource location in a received data channel based on the data channel puncturing information. The communications interface is configured to receive the indication information, the data channel puncturing information, and the data channel from a network device. The terminal may further include a memory, and the memory is configured to be coupled to the processor, and stores a program instruction and data that are necessary for the terminal.

The terminal may further include a bus. The communications interface, the processor, and the memory may be connected to each other by the bus.

According to a fourth aspect, a communications system is provided, where the communications system includes the network device in the second aspect and the terminal in the third aspect.

According to a fifth aspect, a computer storage medium is provided, and is configured to store a computer software instruction used by the network device. The computer storage medium includes a program implemented in the network device in the foregoing aspect.

According to a sixth aspect, a computer storage medium is provided, configured to store a computer software instruction used by the terminal. The computer storage medium includes a program implemented in the terminal in the foregoing aspect.

DETAILED DESCRIPTION OF ILLUSTRATIVE EMBODIMENTS

The following describes the technical solutions in the embodiments of this application in detail with reference to the accompanying drawings in the embodiments of this application.

Currently, in an application scenario in which communication may be performed in a data channel puncturing manner, if a terminal cannot accurately learn whether puncturing information needs to be detected, and cannot accurately learn specific puncturing information when the puncturing information needs to be detected, the terminal cannot accurately learn, when receiving and decoding data transmitted on a data channel, which data is data that should be received and demodulated by the terminal, and which data is data that does not need to be received and demodulated. Consequently, data transmission performance is affected.

Figure 1:
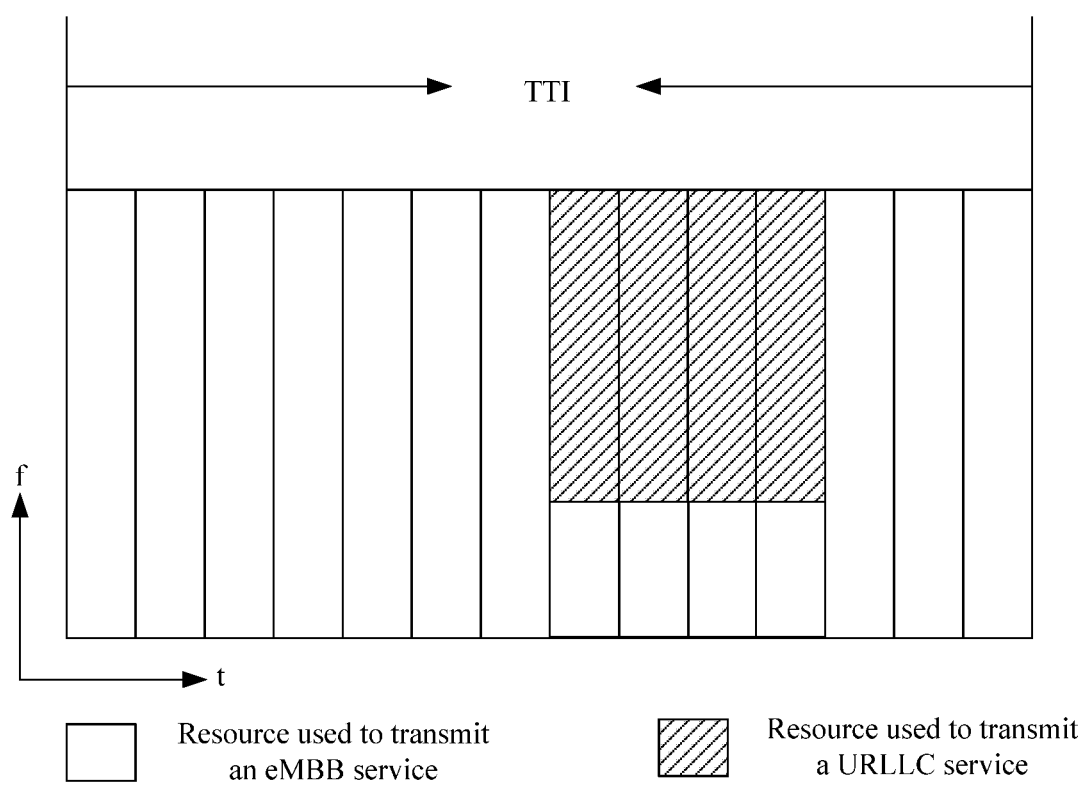
FIG. 1 is a schematic diagram of performing data transmission in a data channel puncturing manner.

An embodiment of this application provides data channel sending and receiving methods, to notify a terminal whether puncturing information needs to be detected, and to notify specific puncturing information when the puncturing information needs to be detected. In this way, correct decoding by the terminal is ensured to an extent, to reduce a performance loss. For example, when a URLLC service is transmitted in a data channel puncturing manner shown in FIG. 1, and occupies some symbols in a TTI that has been used to transmit another service (an eMBB service), a terminal that is receiving a non-URLLC service in the TTI can learn, using the data channel sending and receiving methods provided in this embodiment of this application, symbol and resource block locations occupied by the URLLC service, so that the terminal that is receiving the non-URLLC service knows, when performing decoding, which data does not belong to the terminal, and consequently a performance loss is reduced to an extent.

The data channel sending and receiving methods provided in this embodiment of this application are applicable to a wireless communications system that can perform communication in a data channel puncturing manner, for example, may be applied to at least a 5G communications system supporting three communication services: an eMBB communication service, an mMTC communication service, and a URLLC communication service.

It should be noted that the data channel sending and receiving methods provided in this embodiment of this application may be applied to communication between two terminals or two machines. Communication between a network device and a terminal is used as an example below in this embodiment of this application for description. Certainly, if the data channel sending and receiving methods are applied to communication between two terminals or two machines, a network device in the following embodiment may also be replaced with a terminal or a machine, and a terminal may also be replaced with a machine.

It should be further noted that a network device in this embodiment of this application may include various apparatuses providing a communication function for the terminal in a radio access network, for example, may include a base station. The base station may include a macro base station, a micro base station, a relay station, an access point, and the like in various forms. In a system using different radio access technologies, the base station may have different names. For example, the base station is referred to as a central unit (CU) and a distributed unit (DU) in a 5G mobile communications system in future, an evolved NodeB (evolved NodeB, eNB or eNodeB for short) in a Long Term Evolution (LTE) network, and a NodeB (NodeB) in a third generation 3G network.

The terminal in this embodiment of this application may include various handheld devices, in-vehicle devices, wearable devices, and computing devices that have a wireless communication function, or other processing device connected to a wireless modem, and various forms of user equipment (UE), mobile stations (MS), terminal devices (Terminal Equipment), and the like.

Figure 2:
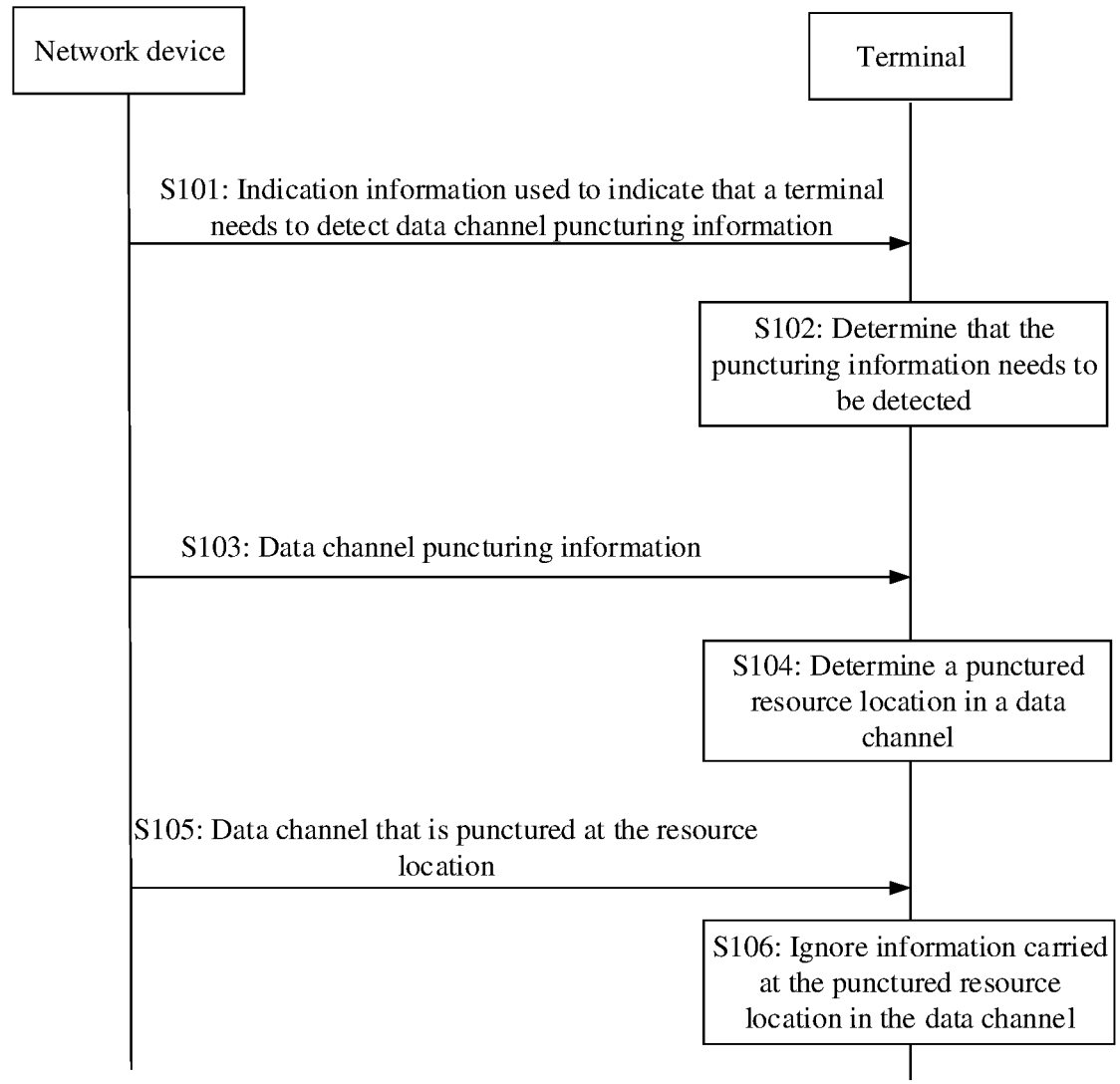
FIG. 2 is a flowchart of implementation of data channel sending and receiving processes according to an embodiment of this application.

FIG. 2 is a flowchart of implementation of methods for sending and receiving data channel puncturing information according to an embodiment of this application. As shown in FIG. 2, the methods include the following.

S101: A network device sends, to a terminal, indication information indicating that the terminal needs to detect data channel puncturing information.

S102: The terminal receives the indication information, and determines that the data channel puncturing information needs to be detected.

S103: The network device sends the data channel puncturing information to the terminal, where the data channel puncturing information indicates a punctured resource location.

S104: The terminal receives the data channel puncturing information, and determines the punctured resource location in a data channel.

S105: The network device sends the data channel to the terminal, where the data channel is punctured at the resource location.

S106: The terminal receives the data channel from the network device, and ignores information carried at the punctured resource location in the data channel.

In the data channel sending and receiving methods provided in this embodiment of this application, the network device sends, to the terminal, the indication information indicating that the terminal needs to detect the data channel puncturing information, so that the terminal detects the data channel puncturing information only when needing to detect the data channel puncturing information. Therefore, unnecessary detection performed by the terminal can be avoided, and performance is improved. Further, the network device sends the data channel puncturing information to the terminal, so that the terminal may determine, when receiving data, data on which resource location in a data channel does not belong to the terminal, and data is more desirably received. Therefore, a performance loss caused by puncturing during data transmission is reduced.

It should be noted that the performed steps in the methods shown in FIG. 2 in this embodiment of this application are merely an example for description, and a performing sequence is not limited. For example, a sequence of performing step S103 and step S105 is not limited. In other words, a sequence in which the network device sends the data channel puncturing information and the data channel to the terminal is not limited in this embodiment of this application. For example, the network device may send the data channel puncturing information before or after sending the data channel, or may send the data channel puncturing information during a process of sending the data channel. This is not limited in this embodiment of this application.

A specific implementation process in which the network device notifies the terminal that the puncturing information needs to be detected and the terminal determines that the puncturing information needs to be detected is described below based on an actual application in this embodiment of this application.

In a first implementation, the network device notifies the terminal of a modulation and coding scheme or a modulation scheme used for the data channel, and when an order used by the modulation and coding scheme or the modulation scheme is less than or equal to an order threshold, the terminal needs to detect the puncturing information.

When the modulation and coding scheme (MCS) or the modulation scheme used by the terminal uses a higher order for modulation, when puncturing is performed, lost information is hard to restore if an information loss occurs. Consequently, data transmission fails. Therefore, the data channel is usually not punctured during higher order modulation. Therefore, an order threshold for the modulation and coding scheme or the modulation scheme may be set in this embodiment of this application. When the order used by the modulation and coding scheme or the modulation scheme is less than or equal to the order threshold, it indicates that the terminal needs to detect the data channel puncturing information.

In this embodiment, the order threshold may be preset, or may be notified by the network device to the terminal in a notification message. Presetting the order threshold is that the order threshold is a default order threshold for the network device and the terminal, and the network device does not need to send signaling to instruct the terminal performing communication to preset the order threshold. When the network device notifies the order threshold to the terminal in the notification message, the network device sends the notification message to the terminal in a system message or radio resource control (RRC) signaling, and the terminal obtains the order threshold by receiving the system message or the RRC signaling.

In this embodiment of this application, regardless of whether a manner of performing notification by the network device or a presetting manner is used, the network device and a base station do not puncture, by default, a data channel in a modulation scheme whose order is higher than the order threshold. Therefore, when receiving the modulation and coding scheme or the modulation scheme sent by the network device, the terminal may determine, by comparing the order of the modulation and coding scheme or the modulation scheme and the order threshold, whether the puncturing information needs to be detected. If the order used by the modulation and coding scheme or the modulation scheme is less than or equal to the order threshold, the terminal needs to detect the puncturing information. If the order used by the modulation and coding scheme or the modulation scheme is greater than the order threshold, the terminal does not need to detect the puncturing information.

It should be noted that the network device may puncture a data channel that is being transmitted and that is in a high modulation and coding scheme or a high modulation scheme, for example, may occupy some symbols of a resource block that is being transmitted and that is in the high modulation and coding scheme or the high modulation scheme, to transmit a URLLC service. However, for the terminal, it is usually hard to successfully decode a punctured data channel in the high modulation and coding scheme or the high modulation scheme. Therefore, there is little sense whether the terminal detects the puncturing information.

In this embodiment of this application, when communication is performed in a data channel puncturing manner, transmission performance of performing data transmission in a data channel resource can be improved. For example, a performance loss of a non-URLLC service on a data channel punctured for the URLLC service can be reduced. In addition, processing load of the terminal can be reduced, so that the terminal detects the puncturing information only when the puncturing information needs to be detected.

In this embodiment of this application, when the indication information includes the modulation and coding scheme or the modulation scheme used for the data channel of the terminal, the network device may send the indication information by scheduling downlink control information (DCI) of the data channel. The scheduled downlink control information of the data channel can indicate a resource location in the data channel. In this embodiment of this application, for ease of description, the downlink control information indicating the resource location in the data channel may be referred to as first downlink control information. The indication information includes the modulation and coding scheme or the modulation scheme used for the data channel and that is in the first downlink control information. The terminal may determine the corresponding modulation and coding scheme or the corresponding modulation scheme by receiving the first downlink control information. The terminal may determine the order of the used modulation and coding scheme or the used modulation scheme by the modulation and coding scheme or the modulation scheme, and the order of the modulation and coding scheme or the modulation scheme is less than or equal to the order threshold, so as to determine that the puncturing information needs to be detected.

In a second implementation, the network device sends the indication information to the terminal in a system message or RRC signaling, and the indication information indicates that the terminal needs to detect the data channel puncturing information.

In this embodiment of this application, the network device may directly indicate, in the indication information, that the terminal needs to detect the data channel puncturing information. For different data channels, service data may be transmitted on some data channels in a puncturing manner, and service data may not be transmitted on other data channels in the puncturing manner. Therefore, the network device directly indicates, in the indication information, that the terminal needs to detect the puncturing information when using a data channel to access a current network. After receiving the indication information, the terminal directly determines that the used data channel is punctured. When the terminal has not received the indication information, the terminal may directly determine that the used data channel is not punctured.

In a third implementation, the network device notifies the resource location used for the data channel to the terminal. When the resource location includes a preset punctured resource location, the terminal needs to detect the data channel puncturing information.

In this embodiment, the resource location in the data channel is a frequency domain resource location occupied by the data channel, such as a resource block location occupied by the data channel, a subband location occupied by the data channel, or a carrier occupied by the data channel. The preset resource location is a punctured frequency domain resource location, such as a punctured resource block location, a punctured subband location, or a punctured carrier.

In this embodiment of this application, the network device may send the indication information in the first downlink control information indicating the resource location in the data channel, and the indication information includes the preset punctured resource location in the data channel.

Further, in this embodiment, the preset resource location may be preset by a system, or is notified in a system message or higher layer signaling (such as RRC signaling). The network device sends information about the preset resource location to the terminal in the system message or the higher layer signaling (such as the RRC signaling), and the terminal obtains the information about the preset resource location by receiving the system message or the higher layer signaling (such as the RRC signaling).

In the foregoing three implementations in this embodiment of this application, the network device sends, to the terminal in the system message, the higher layer signaling, or the downlink control information, the indication information indicating that the terminal needs to detect the data channel puncturing information, so that the terminal performs detection when needing to detect the puncturing information. Therefore, unnecessary detection performed by the terminal can be avoided, and performance is improved.

In this embodiment of this application, if the indication information indicates that the terminal needs to detect the data channel puncturing information, when the data channel is punctured, the network device sends the data channel puncturing information to the terminal, and the terminal receives the data channel puncturing information, so that the terminal may determine, when receiving and demodulating data, data on which data channel resource does not belong to the terminal, and data is more desirably received. Therefore, a performance loss caused by puncturing during data transmission is reduced.

An implementation process in which the network device sends the data channel puncturing information and the terminal receives the data channel puncturing information is described below based on an actual application in this embodiment of this application.

In this embodiment of this application, the data channel puncturing information sent by the network device or received by the terminal includes the punctured resource location, and the punctured resource location includes a punctured time domain symbol location and/or a punctured resource block location in the data channel.

In this embodiment of this application, the network device may send the data channel puncturing information in the downlink control information, and the terminal may receive the data channel puncturing information in the downlink control channel.

Optionally, in this embodiment of this application, the downlink control information includes all punctured resource locations in the data channel, and a piece of downlink control information may be sent to notify the data channel puncturing information to all terminals transmitting data in a punctured data channel. In the implementation, sent data in the DCI can be reduced and load of the downlink control channel can be reduced.

In this embodiment of this application, a sequence of sending a symbol of the downlink control information indicating the data channel puncturing information and sending a symbol of a downlink data channel is not limited. For example, the symbol of the downlink control information indicating the data channel puncturing information may be sent after or before the symbol of the downlink data channel is sent.

In this embodiment of this application, there may be one or more of the following implementations in which the network device sends the punctured resource location in the downlink control information and the terminal receives the data channel puncturing information in the downlink control information.

In a first implementation, the network device notifies the data channel puncturing information to at least one terminal in a piece of downlink control information.

In this embodiment of this application, for ease of description, the downlink control information used to send the data channel puncturing information may be referred to as second downlink control information.

The network device may scramble the second downlink control information by a radio network temporary identifier (RNTI) having a specified value, to identify that the second downlink control information is downlink control information used to send the data channel puncturing information. The specified value may be any one of FFF4 to FFFC, for example, may be FFF5. Certainly, a value of the RNTI is not limited in this embodiment of this application, for example, may be any unused value selected from 0000 to FFFF. The second downlink control information scrambled by the RNTI indicates the data channel puncturing information.

In this embodiment of this application, the second downlink control information is sent in a common search space. The terminal detects, in the common search space by the RNTI, the second downlink control information indicating the data channel puncturing information, and determines the punctured resource location based on the detected second downlink control information.

Optionally, in this embodiment of this application, the second downlink control information that is scrambled by the RNTI and that indicates the data channel puncturing information may use the same number of information bits as that in other downlink control information format, to reduce a quantity of blind detection times of the terminal. The other downlink control information is currently used and is different from the downlink control information used to send the data channel puncturing information in this embodiment of this application, for example, the downlink control information used to schedule the data channel.

In a second implementation, the network device may send the data channel puncturing information by extending other downlink control information. In addition to a bit used to notify scheduling information, the other downlink control information further includes an extension bit. The extension bit indicates the data channel puncturing information. The terminal receives the downlink control information, and determines the punctured resource location by the extension bit.

In this embodiment of this application, the other downlink control information may be extended, and a new downlink control information format does not need to be added.

In a third implementation, a manner in which data transmission in a short transmission time interval is disabled using the second downlink control information indicates the data channel puncturing information.

In this embodiment of this application, the short transmission time interval is a transmission time interval that is less than 1 ms. For example, a transmission time interval of 1 ms is 14 symbols. The short transmission time interval may be two symbols, three symbols, or four symbols.

In this embodiment of this application, the disabling is that data transmitted in the short transmission time interval does not need to be received. In this embodiment of this application, indicating that a data channel in the short transmission time interval is disabled is indicating that the data channel in the short transmission time interval is punctured.

Specifically, in this embodiment of this application, a dedicated bit may be used in the downlink control information to indicate whether a data channel in a corresponding short transmission time interval is punctured. After receiving the downlink control information, the terminal may determine, by the dedicated bit specially indicating whether the data channel in the corresponding short transmission time interval is punctured, whether the data channel in the short transmission time interval is punctured, in other words, whether the data channel needs to be received. If the dedicated bit indicates that the data channel in the corresponding short transmission time interval is punctured, the terminal determines that data in the short transmission time interval does not need to be received; or if the dedicated bit indicates that the data channel in the corresponding short transmission time interval is not punctured, the terminal determines that data in the short transmission time interval needs to be received.

In a fourth implementation, the data channel puncturing information may further include a sequence indicating that the data channel is punctured, and the terminal determines, by detecting the sequence, whether the data channel is punctured.

In this embodiment of this application, a special sequence may be inserted into the data channel, and whether a time domain symbol needs to be punctured is identified by the special sequence.

It should be noted that the special sequence may be a pseudo random sequence, a Zadoff-Chu (ZC) sequence, or other sequence. The sequence is generated based on a sequence parameter. The sequence parameter may be preset, or may be notified by the network device to the terminal. The notification manner may be notifying the terminal by the network device in a system message, or notifying the terminal by the network device in a RRC signaling, or notifying the terminal by the network device in a piece of downlink control information.

In a possible implementation, the sequence includes a first sequence. The first sequence is located in a preceding time domain symbol of a time domain symbol where the punctured resource location in the data channel is located, and indicates that puncturing is performed starting from the next time domain symbol of the time domain symbol where the first sequence is located.

When the network device sends data, the first sequence is inserted into the preceding time domain symbol of the time domain symbol where puncturing is performed. When receiving the data, the terminal performs detection on the first sequence. If the first sequence is detected, puncturing is performed starting from the next time domain symbol after the time domain symbol where the first sequence is located. The carried information may be ignored by the terminal, and that the carried information may be ignored is that data demodulation is not performed on the carried information.

Further, a second sequence may be further set in this embodiment of this application. The second sequence is located in a next time domain symbol of a last time domain symbol where the punctured resource location in the data channel is located, and indicates that the data channel is not punctured starting from the time domain symbol where the second sequence is located.

When the network device sends data, the second sequence is inserted into the next time domain symbol of the last time domain symbol where the punctured resource location is located, so that the terminal can determine, when the second sequence is detected, that the time domain symbol where the second sequence is located and a time domain symbol after the time domain symbol where the second sequence is located are not punctured, and the terminal normally receives the carried information.

In this embodiment of this application, the puncturing information is indicated using the fourth implementation, so that the terminal can be instructed to detect the data channel puncturing information while control information and signaling are not added.

In this embodiment of this application, the network device sends the data channel puncturing information to the terminal, so that the terminal receives the data channel puncturing information, the terminal may determine, when receiving data, data on which data channel resource does not belong to the terminal, and data is more desirably received and demodulated. Therefore, a performance loss caused by puncturing during data transmission is reduced.

The foregoing mainly describes the solutions provided in the embodiments of this application from the perspective of interaction between the network device and the terminal. It may be understood that, to implement the foregoing functions, the network device and the terminal include a corresponding hardware structure and/or software module for performing the functions. With reference to the examples described in the embodiments disclosed in this application, units and algorithm steps can be implemented by hardware or a combination of hardware and computer software in this embodiment of this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the technical solutions in the embodiments of this application.

In this embodiment of this application, functional units of the network device and the terminal may be obtained through division based on the foregoing method example. For example, each functional unit may be obtained through division based on each function, or two or more functions may be integrated into one processing unit. The integrated unit may be implemented in a form of hardware, or may be implemented in a form of a software functional unit. It should be noted that the unit division in the embodiments of this application is an example, and is merely logical function division. There may be other division manner in an actual implementation.

Figure 3:
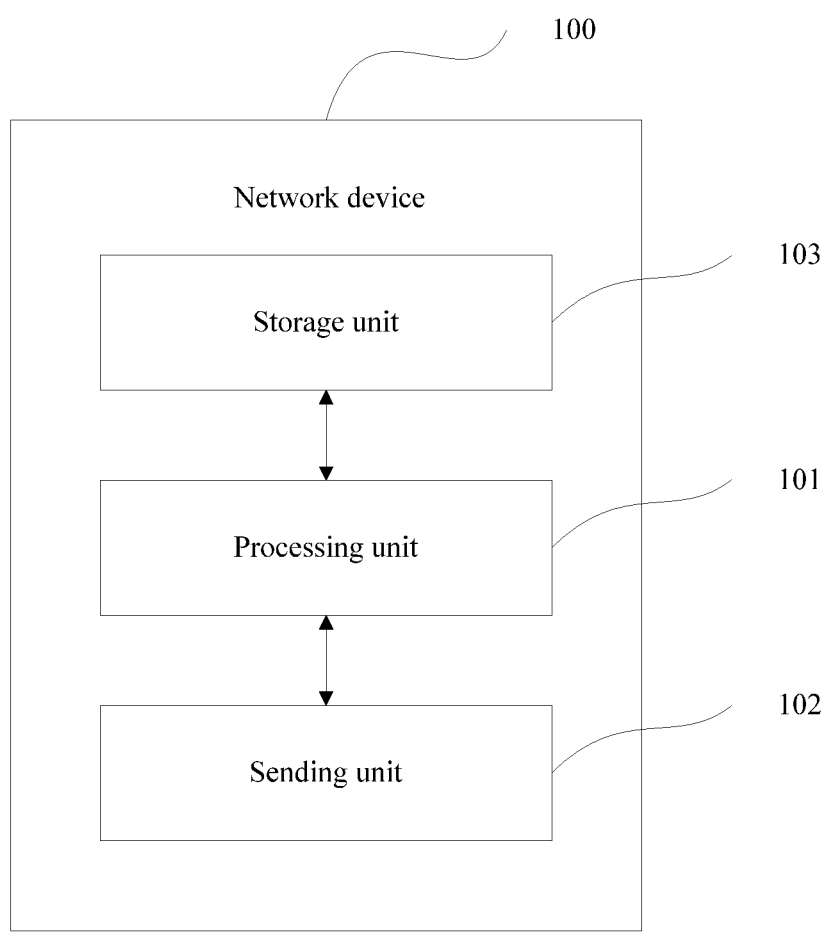
FIG. 3 is a schematic structural diagram of a network device according to an embodiment of this application.

When an integrated unit is used, FIG. 3 is a schematic structural diagram of a possible network device 100 according to an embodiment of this application. The network device 100 may include a processing unit 101 and a sending unit 102. The processing unit 101 is configured to control and manage an action performed by the network device 100. For example, the processing unit 101 may be configured to support the network device 100 in performing processes S101, S103, and S105 in FIG. 2: determining indication information indicating that a terminal needs to detect data channel puncturing information, determining a data channel and the data channel puncturing information, and sending the indication information, the data channel puncturing information, and the data channel to the terminal by the sending unit 102. Certainly, the processing unit 101 may be further configured to support the network device 100 in performing other process of a technology described in the specification. The sending unit 102 is configured to support communication between the network device 100 and other communications entity, for example, communication between the network device 100 and the terminal shown in FIG. 2. The network device 100 may further include a storage unit 103, configured to store program code and data of the network device.

The processing unit 101 may be a processor or a controller. The sending unit 102 may be a communications interface, a transceiver, a transceiver circuit, or the like. The communications interface is a collective name, and may include one or more interfaces. The storage unit 103 may be a memory.

Figure 4:
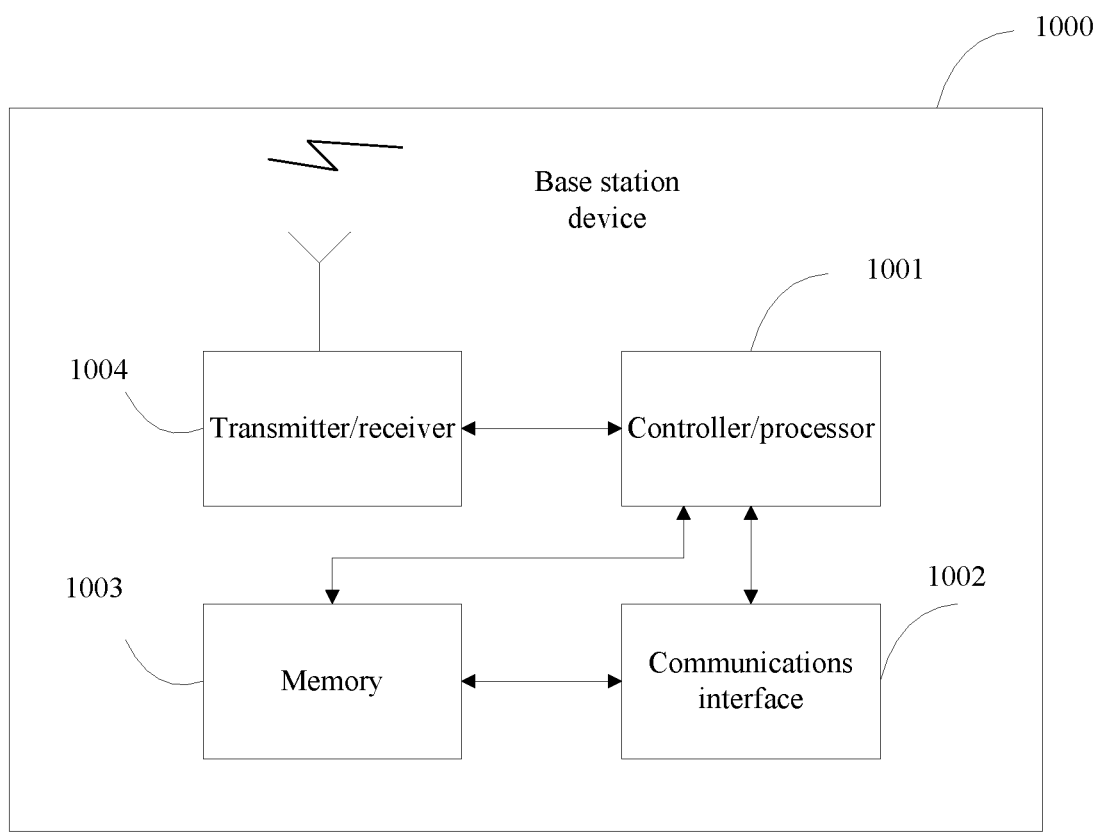
FIG. 4 is a schematic structural diagram of a base station device according to an embodiment of this application.

When the processing unit 101 is a processor, the sending unit 102 is a communications interface, and the storage unit 103 is a memory, the network device 100 in this embodiment of this application may be a network device shown in FIG. 4. The network device shown in FIG. 4 may be a base station device 1000.

FIG. 4 shows a possible base station device 1000 according to an embodiment of this application, in other words, shows another possible network device according to an embodiment of this application. Referring to FIG. 4, the base station device 1000 includes a processor 1001 and a communications interface 1002. The processor 1001 may be a controller, and is indicated as a "controller/processor 1001" in FIG. 4. The communications interface 1002 is configured to: support information sending and receiving between the base station device 1000 and the terminal in the foregoing embodiment, and support radiocommunication between the base station device 1000 and other communications entity. The processor 1001 performs various functions used to communicate with the terminal, and may further demodulate or modulate data on an uplink and/or a downlink.

The base station device 1000 may further include a memory 1003, and the memory 1003 is configured to store program code and data of the base station device 1000.

Further, the base station device 1000 may further include a transmitter/receiver 1004. The transmitter/receiver 1004 is configured to: support information sending and receiving between the base station device 1000 and the terminal in the foregoing embodiment, and support radio communication between the terminal and other terminal. The processor 1001 may perform various functions used to communicate with the terminal. For example, on the uplink, an uplink signal from the terminal is received by an antenna, demodulated by the receiver 1004 (for example, a high frequency signal is demodulated into a baseband signal), and is further processed by the processor 1001, to restore service data and signaling information sent by the terminal. On the downlink, service data and a signaling information are processed by the processor 1001, and are modulated by the transmitter 1004 (for example, a baseband signal is modulated into a high frequency signal) to generate a downlink signal. The downlink signal is transmitted to the terminal by the antenna. It should be noted that the demodulation or modulation function may alternatively be implemented by the processor 1001.

It may be understood that FIG. 4 shows only a simplified design of the base station device 1000. In an actual application, the base station device 1000 may include any quantity of transmitters, receivers, processors, controllers, memories, communications units, and the like. All base station devices that can implement this embodiment of this application fall within the protection scope of the embodiments of this application.

It may be further understood that the network device 100 and the base station device 1000 in the embodiments of this application may be configured to implement the corresponding function of the network device in the foregoing method embodiment in the embodiments of this application. Therefore, for content that is not described in detail in this embodiment of this application, refer to descriptions of a related method embodiment. Details are not described herein again in this embodiment of this application.

Figure 5:
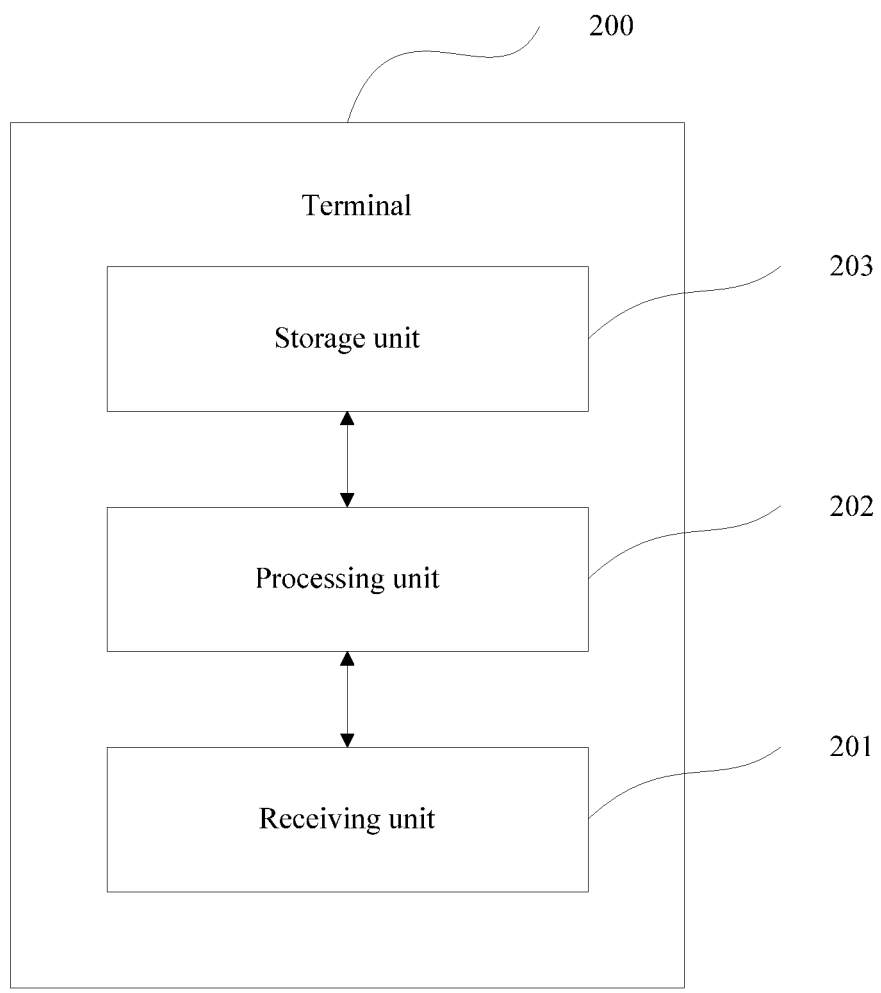
FIG. 5 is a schematic structural diagram of a terminal according to an embodiment of this application.

When an integrated unit is used, FIG. 5 is a schematic structural diagram of a possible terminal 200 according to an embodiment of this application. The terminal 200 includes a receiving unit 201 and a processing unit 202. The processing unit 202 is configured to control and manage an action performed by the terminal 200. For example, the processing unit 202 may be configured to support the terminal 200 in performing processes S102, S104, and S106 in FIG. 2: receiving indication information, data channel puncturing information, and a data channel from a network device by the receiving unit 201, determining, based on the indication information, that the data channel puncturing information needs to be detected, and determining a punctured resource location in the received data channel based on the data channel puncturing information. Certainly, the processing unit 202 may be further configured to support the terminal 200 in performing other process of a technology described in the specification. The receiving unit 201 is configured to support communication between the terminal 200 and other communications entity, for example, communication between the terminal 200 and the network device shown in FIG. 2. The terminal 200 may further include a storage unit 203, configured to store program code and data of the terminal.

The processing unit 202 may be a processor or a controller. The receiving unit 201 may be a communications interface, a transceiver, a transceiver circuit, or the like. The communications interface is a collective name, and may include one or more interfaces. The storage unit 203 may be a memory.

Figure 6:
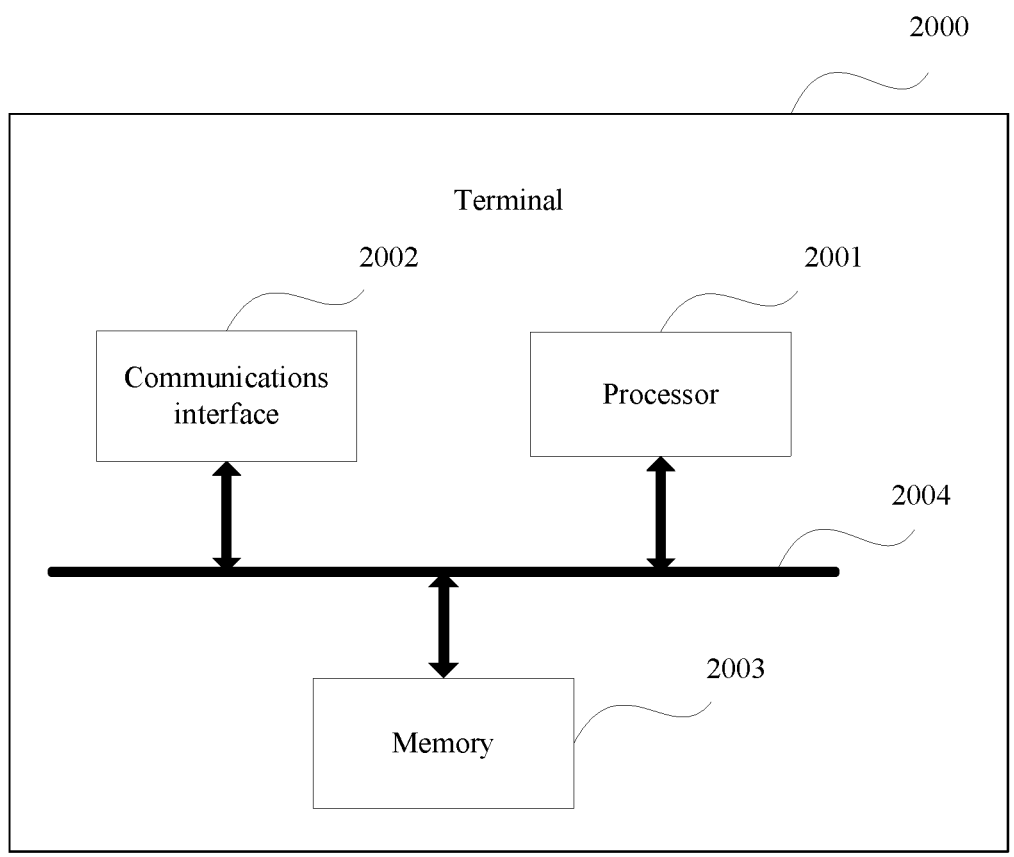
FIG. 6 is a schematic structural diagram of another terminal according to an embodiment of this application.

When the processing unit 202 is a processor, the receiving unit 201 is a communications interface, and the storage unit 203 is a memory, the terminal 200 in this embodiment of this application may be a terminal 2000 shown in FIG. 6.

FIG. 6 shows a possible terminal 2000 according to an embodiment of this application. The terminal 2000 includes a processor 2001, a communications interface 2002, and a memory 2003. Optionally, the terminal 2000 may further include a bus 2004. The communications interface 2002, the processor 2001, and the memory 2003 may be connected to each other by the bus 2004. For ease of indication, the bus is indicated by only one bold line in FIG. 6. However, it does not indicate that there is only one bus or only one type of bus.

It may be understood that FIG. 6 shows only a simplified design of the terminal 2000. In an actual application, the terminal 2000 is not limited to the foregoing structure. For example, the terminal 2000 may further include a display device, an input/output interface, and the like. All terminals that can implement this embodiment of this application fall within the protection scope of the embodiments of this application.

It may be further understood that the terminal 200 and the terminal 2000 in the embodiments of this application may be configured to implement the corresponding function of the terminal in the foregoing method embodiment in the embodiments of this application. Therefore, for content that is not described in detail in this embodiment of this application, refer to descriptions of a related method embodiment. Details are not described herein again in this embodiment of this application.

It should be noted that, the processor or the controller in the embodiments of this application may be a central processing unit (CPU), a general-purpose processor, a digital signal processor (DSP), an application-specific integrated circuit (ASIC), a field programmable gate array (FPGA) or other programmable logic device, a transistor logic device, a hardware component, or any combination thereof. The processor or the controller may implement or execute various examples of logical blocks, modules, and circuits that are described with reference to the content disclosed in this application. Alternatively, the processor may be a combination of computing functions, for example, a combination of one or more microprocessors or a combination of a DSP and a microprocessor. The bus may be a peripheral component interconnect (PCI) bus, an extended industry standard architecture (EISA) bus, or the like. The bus may be classified into an address bus, a data bus, a control bus, and the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk storage, a CD-ROM, an optical memory, and the like) that include computer usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of other programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may be stored in a computer readable memory that can instruct the computer or the other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or other programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

The invention claimed is:

1. A method, comprising:
receiving, by a terminal, indication information from a network device, wherein the indication information instructs the terminal to monitor for data channel puncturing information;
receiving, by the terminal, the data channel puncturing information from the network device based on the indication information, wherein the data channel puncturing information indicates a punctured resource location, and the data channel puncturing information is carried in second downlink control information sent in a common search space; and
receiving, by the terminal, a data channel from the network device, wherein the terminal determines that information to be sent to the terminal will be carried at resource locations other than the punctured resource location in the data channel.

2. The method according to claim 1, wherein the indication information is carried in a system message.

3. The method according to claim 1, wherein the indication information is carried in radio resource control (RRC) signaling.

4. The method according to claim 1, wherein the second downlink control information is scrambled by a radio network temporary identifier (RNTI), and a value of the RNTI is a value that identifies that the second downlink control information is used to send the data channel puncturing information.

5. The method according to claim 1, wherein a symbol of the second downlink control information is sent after a symbol of the data channel.

6. The method according to claim 1, wherein the punctured resource location includes a punctured time domain symbol location or a punctured resource block location in the data channel.

7. A method, comprising:
sending, by a network device, indication information to a terminal, wherein the indication information instructs the terminal to monitor for data channel puncturing information;
sending, by the network device, the data channel puncturing information to the terminal, wherein the data channel puncturing information indicates a punctured resource location, and the data channel puncturing information is carried in second downlink control information sent in a common search space; and
sending, by the network device, a data channel to the terminal, wherein the data channel is punctured at the resource location.

8. The method according to claim 7, wherein the indication information is carried in a system message or radio resource control (RRC) signaling.

9. The method according to claim 7, wherein the second downlink control information is scrambled by a radio network temporary identifier (RNTI) and a value of the RNTI is a value that identifies that the second downlink control information is used to send the data channel puncturing information.

10. The method according to claim 7, wherein a symbol of the second downlink control information is sent after a symbol of the data channel.

11. The method according to claim 7, wherein the punctured resource location includes a punctured time domain symbol location.

12. The method according to claim 7, wherein the punctured resource location includes a punctured resource block location in the data channel.

13. An apparatus, comprising:
a processor; and
a communication interface;
wherein the communication interface is configured to receive indication information, data channel puncturing information, and a data channel from a network device, wherein the indication information instructs the apparatus to monitor for the data channel puncturing information, the data channel puncturing information indicates a punctured resource location, and the data channel puncturing information is carried in second downlink control information sent in a common search space, and the apparatus determines that information to be sent to the apparatus will be carried at resource locations other than the punctured resource location in the data channel; and
wherein the processor is configured to: determine, based on the indication information, to detect the data channel puncturing information, and determine the punctured resource location in the received data channel based on the data channel puncturing information.

14. The apparatus according to claim 13, wherein the indication information is carried in a system message or radio resource control (RRC) signaling.

15. The apparatus according to claim 13, wherein the second downlink control information is scrambled by a radio network temporary identifier (RNTI) and a value of the RNTI is a value that identifies that the second downlink control information is used to send the data channel puncturing information.

16. The apparatus according to claim 13, wherein a symbol of the second downlink control information is sent after a symbol of the data channel.

17. The apparatus according to claim 13, wherein the punctured resource location includes a punctured time domain symbol location or a punctured resource block location in the data channel.

* * * * *